(12) United States Patent
Smith et al.

(10) Patent No.: US 10,445,504 B2
(45) Date of Patent: *Oct. 15, 2019

(54) SECURE REMOTE KERNEL MODULE SIGNING

(71) Applicant: RED HAT, INC., Raleigh, NC (US)

(72) Inventors: David Smith, Huntsville, AL (US); Frank Ch. Eigler, Toronto (CA)

(73) Assignee: Red Hat, Inc., Raleigh, NC (US)

(*) Notice: Subject to any disclaimer, the term of this patent is extended or adjusted under 35 U.S.C. 154(b) by 151 days.

This patent is subject to a terminal disclaimer.

(21) Appl. No.: 15/438,470

(22) Filed: Feb. 21, 2017

(65) Prior Publication Data

US 2017/0161502 A1    Jun. 8, 2017

Related U.S. Application Data

(63) Continuation of application No. 14/456,224, filed on Aug. 11, 2014, now Pat. No. 9,608,823.

(51) Int. Cl.
*H04L 9/32* (2006.01)
*H04L 9/08* (2006.01)
(Continued)

(52) U.S. Cl.
CPC .......... *G06F 21/575* (2013.01); *G06F 9/4406* (2013.01); *G06F 21/00* (2013.01);
(Continued)

(58) Field of Classification Search
CPC ...... G06F 21/575; G06F 9/4406; G06F 21/00; G06F 21/64; H04L 9/0861; H04L 9/30; H04L 9/3247
(Continued)

(56) References Cited

U.S. PATENT DOCUMENTS 5,991,399 A    11/1999 Graunke et al.
6,189,100 B1 *  2/2001 Barr ................. G06F 21/575
                                                380/255
(Continued)

FOREIGN PATENT DOCUMENTS

CN    101645127    2/2010
CN    102902530    1/2013
CN    103514414    1/2014

OTHER PUBLICATIONS

Greg Kroah-Hartman, Signed Kernel Modules, LINUX Journal (Year: 2004).*

(Continued)

*Primary Examiner* — Shanto Abedin
(74) *Attorney, Agent, or Firm* — Lowenstein Sandler LLP

(57) ABSTRACT

Implementations for a secure remote kernel module signing are disclosed. In one example, the method includes receiving an indicator of a public key associated with a client computing device, determining that the public key associated with the client computing device is in common with a public key associated with a first server computing device, compiling the script, signing the compiled script with a private key that is associated with the public key that is in common with the client computing device and the first server computing device without generating a new private key, and sending the signed compiled script to the client computing device.

20 Claims, 6 Drawing Sheets

(51) Int. Cl.
- *G06F 21/00* (2013.01)
- *G06F 21/57* (2013.01)
- *G06F 9/4401* (2018.01)
- *H04L 9/14* (2006.01)
- *H04L 9/30* (2006.01)
- *G06F 21/64* (2013.01)

(52) U.S. Cl.
CPC ............ *G06F 21/64* (2013.01); *H04L 9/0861* (2013.01); *H04L 9/14* (2013.01); *H04L 9/30* (2013.01); *H04L 9/3247* (2013.01); *G06F 2221/034* (2013.01); *H04L 9/3239* (2013.01)

(58) Field of Classification Search
USPC ........................................................ 713/156
See application file for complete search history.

(56) References Cited

U.S. PATENT DOCUMENTS

| | | | | |
|---|---|---|---|---|
| 6,748,528 | B1* | 6/2004 | Greenfield | H04L 63/0823 713/151 |
| 8,332,635 | B2 | 12/2012 | Plouffe, Jr. et al. | |
| 8,667,298 | B2* | 3/2014 | Eigler | G06F 21/57 713/176 |
| 8,832,455 | B1* | 9/2014 | Drewry | G06F 21/575 713/187 |
| 2008/0253571 | A1* | 10/2008 | Rits | H04L 9/0825 380/277 |
| 2008/0301440 | A1* | 12/2008 | Plouffe, Jr. | G06F 21/51 713/164 |
| 2010/0287363 | A1* | 11/2010 | Thorsen | G06F 21/575 713/2 |
| 2011/0225420 | A1* | 9/2011 | Eigler | G06F 21/57 713/158 |
| 2011/0320816 | A1 | 12/2011 | Yao et al. | |
| 2013/0152180 | A1* | 6/2013 | Nair | H04L 63/0823 726/6 |
| 2015/0113618 | A1* | 4/2015 | Sinha | G06F 21/44 726/6 |
| 2015/0200934 | A1* | 7/2015 | Naguib | G06F 21/575 713/2 |
| 2016/0043870 | A1 | 2/2016 | Avanzi | |
| 2016/0132681 | A1* | 5/2016 | Karame | G06F 21/51 713/2 |

OTHER PUBLICATIONS

Luigi Catuogno et al., An Architecture for Kernel-Level Verification of Executables at Run Time, The Computer Journal (Year: 2004).*

Axelle Apvrille, DigSig: Run-time Authentication of Binaries at Kernel Level, USENIX (Year: 2004).*

Winter, Johannes, Institute for Applied Information Processing and Communications (IAIK) Graz, University of Technology, "Trusted Computing Building Blocks for Embedded Linux-based ARM TrustZone Platforms," http://cs.ucsb.edu/~sherwood/cs290/papers/trustzone.pdf, Oct. 31, 2008, 10 pages.

Kroah-Hartman, Greg, "Signed Kernel Modules," http://www.ee.ryerson.ca/~courses/coe518/LinuxJournal/elj2004-117-signedmodules.pdf, 7 pages, Jun. 18, 2006.

Joeyli, "Re: [opensuse-kernel] Secure boot with self built kernel on openSUSE or SLES," http://lists.opensuse.org/opensuse-kernel/2013-03/ms900009.html, 4 pages, Mar. 5, 2013.

Kroah-Hartman, Greg (Sep. 2, 2013). "Booting a Self-signed Linux Kernel". 4 pages.

* cited by examiner

SECURE REMOTE KERNEL MODULE SIGNING

RELATED APPLICATION

This application is a continuation of U.S. patent application Ser. No: 14/456,224, filed Aug. 11, 2014, which is hereby incorporated by reference in its entirety.

TECHNICAL FIELD

The present disclosure relates to module signing, and more specifically to secure remote kernel module signing.

BACKGROUND

Traditionally, scripts have provided full system-wide instrumentation to system administrators, including visibility and manipulation capabilities into a kernel or arbitrary user processes. A script is a series of commands in a computer source code within a file that is capable of being executed. The script can be compiled and signed by a private key or a digital signature key, which is a mathematical scheme used to authenticate a digital message. Digital signature keys are used for software distribution, for example, in situations where it is important to detect improper use of the software. One form of a digital signature key is public key cryptography.

Public key cryptography requires two separate keys, 1) a private key and 2) a public key. The private key and the public key are mathematically linked, however, it is nearly impossible or computationally unfeasible to determine a private key from its corresponding public key.

On the server side, data to be signed is fed through a hash function to obtain a hashed value. The hashed value is encrypted with the private key to create a signature. The signature is attached to the unencrypted data. The data with the attached signature can be sent to a receiver. The receiver can then verify the data by feeding the data without the digital signature through the same hash function to obtain a hash value. The receiver can then decrypt the digital signature using the public key. If the hash value and the decrypted digital signature match, then the data has been verified.

The Unified Extensible Firmware Interface (UFEI) is a specification that defines a software interface between an operating system (OS) and platform firmware. An operating system that can be booted from a UFEI can directly boot a computing system using a UFEI operating system loader stored on a storage device. The UEFI 2.2 specification adds a protocol that can secure the boot process by preventing the loading of drivers or OS loaders that are not signed with an acceptable digital signature.

Secure Boot is a component of an operating system that relies on the UEFI's specification's secure boot functionality to help prevent malicious software applications and "unauthorized" operating systems from loading during the system start-up process. A "Machine Owner Key" (MOK) is a form of a public key that can be used to sign binary code. The MOK can be assigned to a specific machine.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Implementations of the disclosure provide for secure remote kernel module signing. In one implementation, when a kernel module needs to be compiled, a client device checks to see if the client device requires SecureBoot signing. If yes, the client device can send to the compile server a list of machine owner keys (MOKs) or public keys that are present on the client device.

The compile server receives the list of MOKs and compares the list against a list of MOKs on the compile server. If the compile server has no MOKs in common with the MOKs that reside on the client device, then the compile server can create a new private key and a new public key or MOK, sign the kernel module with the new private key, transmit the new public key or MOK to the client device for installation, and then transmit the compiled kernel module signed with the new private key to the client device. If the compile server has an MOK that is in common with an MOK residing on the client device, then the compile server can compile the kernel module, and sign it with the private key that is associated with the MOK that is in common with the client device. The signed module can then be shipped to the client device without generating a new private key and a new MOK.

In another implementation, compile servers broadcast messages indicating kernel versions supported by individual compile servers and MOKs of the individual compile servers. A client device can store a list of MOKs and kernel versions supported by each compile server, and periodically refresh these lists based on new broadcast messages of the servers. When a client device receives a user request for a compiled kernel module, the client device determines, based on the stored lists, whether any compile server supports the kernel version of the client device and has a MOK that matches the MOK of the client device. If so, the client device sends a request for the compiled kernel module to that compile server, and receives the compiled kernel module signed by a private key matching the MOK. If not, the client device selects, based on the stored lists, a server that supports the kernel version of the client device, sends a request for a compiled kernel module to the server, receives a new MOK generated by the server, installs the received MOK, and then receives the compiled kernel module signed by a private key matching the new MOK.

Accordingly, aspects of the present disclosure provide a mechanism for automating the process of building compiled kernel modules signed with MOKs. Because MOKs are associated with trusted kernel vendors, compiled kernel modules signed with private keys matching the MOKs are suitable for secure boot systems of client devices.

Figure 1:
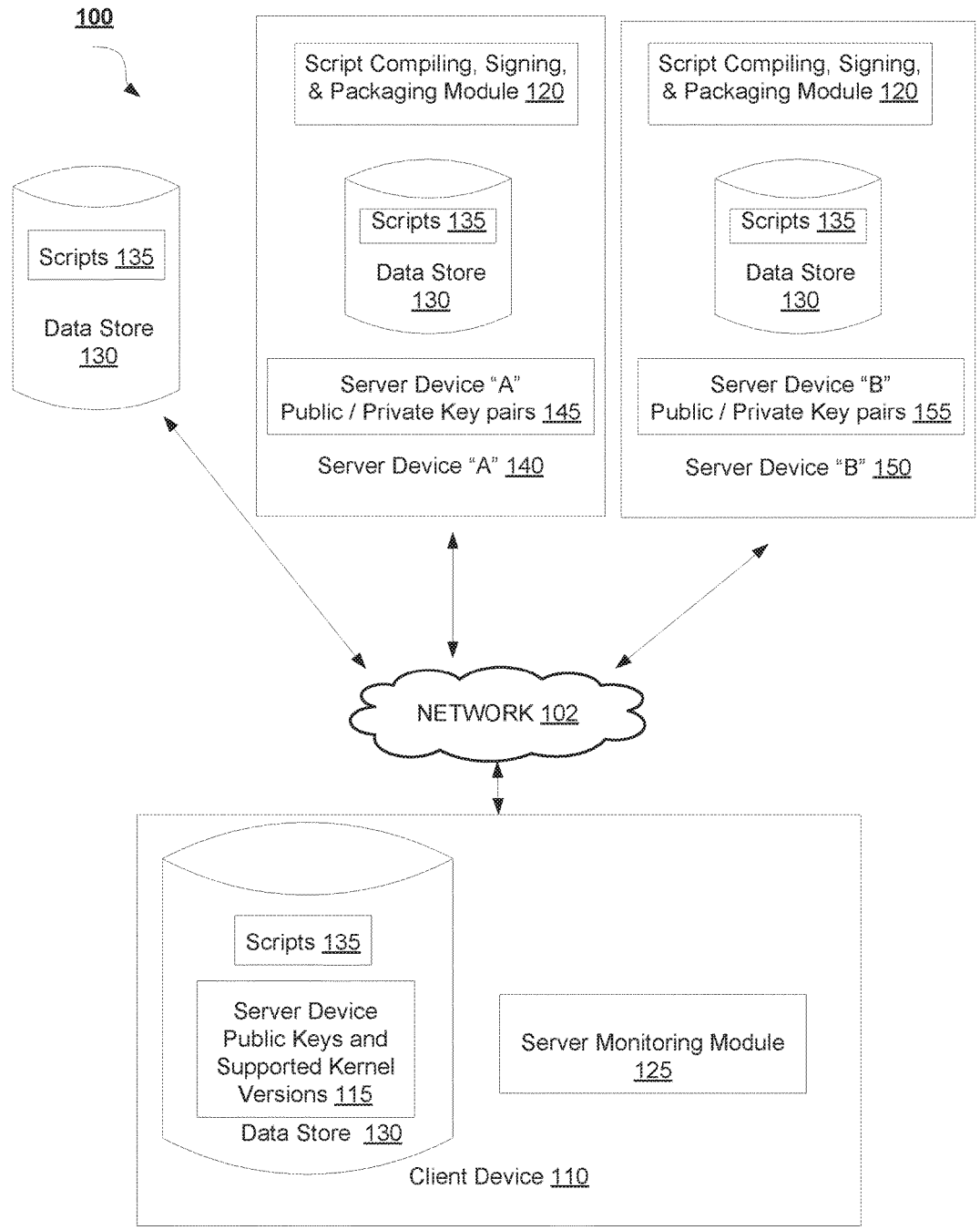
FIG. 1 depicts a block diagram of a network architecture for a secure boot module signing.

FIG. 1 depicts a block diagram of a network architecture 100 for secure remote kernel module signing in which implementations of the present disclosure can operate. The network architecture 100 includes a data store 130, a server device "A" 140, and a server device "B" 150 that can be communicably coupled to a client device 110 via network 102. Network 102 may be a private network (e.g., a local area network (LAN), a wide area network (WAN), intranet, or other similar private networks) or a public network (e.g., the Internet). Server devices 140, 150 can be devices of different vendors providing different versions of kernels and/or kernel modules.

The client device 110, server device "A" 140, and server device "B" 150 can be any type of computing device including server computers, gateway computers, desktop computers, laptop computers, mobile communications devices, cell phones, smart phones, hand-held computers, or similar computing device. An example computing device is described in greater detail below in conjunction with FIG. 6. In other examples, the client device 110, server device "A" 140, and server device "B" 150 can include, and is not limited to, a web interface, web browser, or other client software. The client device can have several public keys (MOKs) to be used for secure boot signing. Similarly, server device "A" public and private key pairs 145 can reside on the server device "A" 140, and server device "B" public and private key pairs 155 can reside on the server device "B" 150.

In an example, a compile server (e.g., server device "A" 140, or server device "B" 150) can include a script compiling, signing, and packaging module 120. The script compiling, signing, and packaging module 120 can receive a list of public keys or MOKs from the client device 110, can determine whether an MOK from the list of received MOKs is in common with an MOK on server device "A" 140 or server device "B" 150, and, if not in common, can generate a new MOK (e.g., a new public key) and a private key pair on the respective compile server device, and send the new MOK to the client device 110. In an example, the script compiling, signing, and packaging module 120 can compile a module or script 135 on a compile server (e.g., server device "A" 140 or server device "B" 150) and sign the compiled module with the private key that is matched with the MOK that is in common with an MOK on the client device. In an example, the script compiling, signing, and packaging module 120 can reside on a different server that can communicate with the compile server device (e.g., server device "A" 140, or server device "B" 150). In another example, the script compiling, signing, and packaging module 120 may be a web application that can be hosted by a server and accessible to the client device 110. For example, a user or a customer environment can include one or more client devices 110 that can communicate with the script compiling, signing, and packaging module 120 via network 102.

The data store 130 can store kernel modules or scripts 135. As used herein, a script is a list of commands in a source code that can be compiled and executed by a certain operating system. The data store 130 can be communicably coupled to the network 102 or may also be included within the client device 110, within the server device "A" 140, or within the server device "B" 150. The data store 130 can be a persistent storage unit that stores kernel modules and scripts 135. A persistent storage unit can be a local storage unit or a remote storage unit. A persistent storage unit can be a magnetic storage unit, optical storage unit, solid state storage unit, electronic storage units (main memory), or similar storage unit. A persistent storage unit can be a monolithic device or a distributed set of devices. A "set," as used herein, refers to any positive whole number of items.

In some implementations, the script compiling, signing, and packaging module 120 can broadcast messages that can be received by various client devices 110. A message can include a list of public keys of a respective server and software versions (e.g., kernel versions) supported by the respective server. The client device 110 can include the server monitoring module 125 which can receive and record message broadcasts from server device "A" 140 and server device "B" 150, and maintain a list 115 of public keys of server devices 140 and 150 and kernel versions supported by server devices 140 and 150 in data store 130. The broadcast messages can be sent by the servers on a periodic basis (e.g., every 15 minutes, and the like), and the server monitoring module 125 can refresh the recorded information upon receipt of the broadcast message from a server. When a user requests a compiled kernel module, the server monitoring module 125 can determine, based on the stored lists, whether any compile server supports the kernel version of the client device 110 and has a MOK that matches the MOK of the client device. If so, the server monitoring module 125 can send a request for the compiled kernel module to that compile server, and receive the compiled kernel module signed by a private key matching the MOK. If not, the server monitoring module 125 can select, based on the stored lists, a server that supports the kernel version of the client device, send a request for a compiled kernel module to the server, receive a new MOK generated by the server, installs the received MOK, and then receive the compiled kernel module signed by a private key matching the new MOK.

Figure 2A:
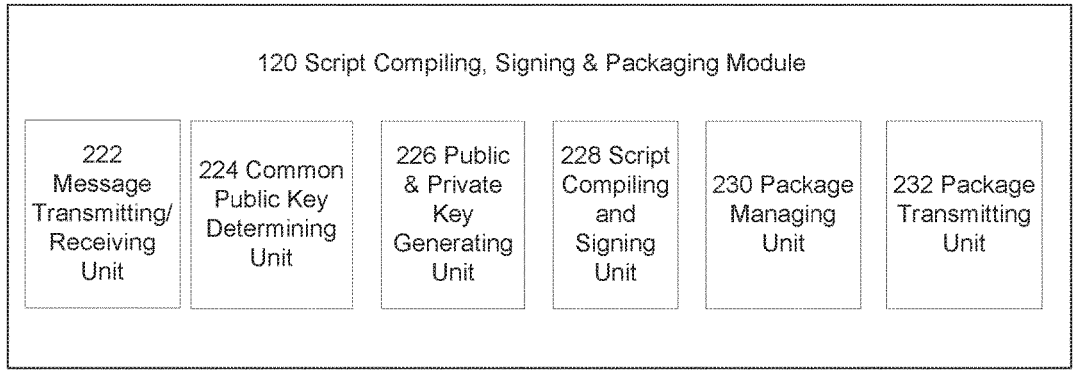
FIG. 2A illustrates a block diagram of a secure boot module signing in accordance with some implementations of the present disclosure.

FIG. 2A illustrates a block diagram of a network architecture for secure remote kernel module signing in accordance with some implementations of the present disclosure. In FIG. 2A, the script compiling, signing, and packaging module 120, of examples of the disclosure, can include a message transmitting/receiving unit 222, a common public key determining unit 224, a public and private key generating unit 226, a script compiling and signing unit 228, a package managing unit 230, and a package transmitting unit 232.

The message transmitting/receiving unit 222 can transmit or broadcast a message indicating a list of public keys and a list of software versions (e.g., supported kernel versions) that are supported by the respective server. The message transmitting/receiving unit 222 can also receive a message indicating a list that includes indicators of public keys or MOKs that reside on or are associated with the client device 110. An example of an indicator of the public key can include a public key fingerprint. A public key fingerprint is a short series of bytes used to authenticate or look up a longer public key. The common public key determining unit 224 can determine whether a public key or an MOK that is associated with the client device 110 is in common with a public key or MOK that resides on or is associated with server device "A" 140 and/or server device "B" 150.

When the common public key determining unit 224 determines that a public key or an MOK that is associated with the client device 110 is in common with a public key or MOK that resides on or is associated with a compile server device (e.g., server device "A" 140), then the script compiling and signing unit 228 can cause the compile server device (e.g., server device "A" 140) to compile the script into an executable such as object code, binary code, a compiled program or application, and the like. In an example, the script compiling and signing unit 228 can cause the compile server device to compile the script into the requested compiled kernel module or script 135 and sign the compiled script 135 using the private key that is associated with the public key or MOK that is in common with a public key or MOK that is associated with the client device 110. The package managing unit 230 can assemble the compiled and signed kernel module or script 135 into a package for distribution to the client device 110, and the package transmitting unit 232 can transmit the package to the client device 110. Upon receipt of the package, the compiled kernel module or script 135 can be used for a secure boot process on the client device 110 using the public key or MOK that is in common with the public key or MOK that resides on or is associated with the compile server device.

In another example, when the common public key determining unit 224 determines that a public key or an MOK that resides on or is associated with the client device 110 is not in common with the list of public keys or MOKs that reside on or are associated with a compile server device (e.g., server device "A" 140 or server device "B" 150), then the public and private key generating unit 226 can generate a new private key and a new public key or a new MOK, and send the new MOK to the client device 110. The script compiling and signing unit 228 can compile the requested kernel module or script 135 and sign the compiled script 135 with the new private key. The package managing unit 230 can assemble the compiled and signed kernel module or script 135 into a package for distribution to the client device 110, and the package transmitting unit 232 can transmit the package to the client device 110. When the client device 110 receives the compiled and signed kernel module or script 135, the client device can proceed to install and execute the compiled and signed kernel module or script 135 using the new public key or the new MOK.

In another example, the kernel module or script 135 can be compiled on one of several different compile servers, wherein each compile server is associated with different public and private keys. If the common public key determining unit 224 determines that a public key or MOK that resides on or is associated with the client device 110 is not in common with a public key or MOK that resides on or is associated with a first compile server, (e.g., server device "A" 140), then the common public key determining unit 224 can check a different compile server, (e.g, server device "B" 150) to determine whether a public key or MOK that resides on or is associated with the different compile server is in common with the MOK or public key that resides on or is associated with the client device 110. If the common public key determining unit 224 determines that a public key or MOK that resides on or is associated with the client device 110 is in common with a public key or MOK that resides on or is associated with the different compile server, then the different compile server can be used to compile the kernel module or script 135 and sign the compiled script using the private key that is associated with the public key or MOK that is common to the client device 110 and to the different compile server. Thus, a new private key and a new public key or MOK does not need to be generated.

In another example, when the common public key determining unit 224 determines that a public key or an MOK that resides on or is associated with the client device 110 is not in common with the list of public keys or MOKs that reside on or are associated with any of the plurality of compile server devices, then the public and private key generating unit 226 can cause a new public key or a new MOK and a new private key to be generated. The script compiling and signing unit can instruct any compile server device to generate a new private key and a new public key or MOK, and compile and sign the kernel module or script 135 using the new private key.

In another example, the script compiling, signing, and packaging module 120 can determine whether the client device 110 requires SecureBoot signing. For example, the script compiling, signing, and packaging module 120 can receive a message from the client device 110 indicating that the client device requires SecureBoot signing. The script compiling, signing, and packaging module 120 can proceed to compile and sign a kernel module or script 135 using the method as discussed above, and send the signed script and, if necessary, the new public key to the client device 110 in response to the determination that the client device 110 requires SecureBoot signing.

In another example, the script compiling, signing, and packaging module 120 can determine whether the client device 110 requires a signed kernel driver or a signed kernel module. For example, the script compiling, signing, and packaging module 120 can receive a message from the client device 110 indicating that the client device requires a signed kernel driver or a signed kernel module. The script compiling, signing, and packaging module 120 can proceed to compile and sign a kernel module or script 135 using the method as discussed above, and send the a compiled and signed kernel driver or a compiled and signed kernel module and, if necessary, the new public key to the client device 110 in response to the determination that the client device 110 requires a signed kernel driver or a signed kernel module.

Figure 2B:
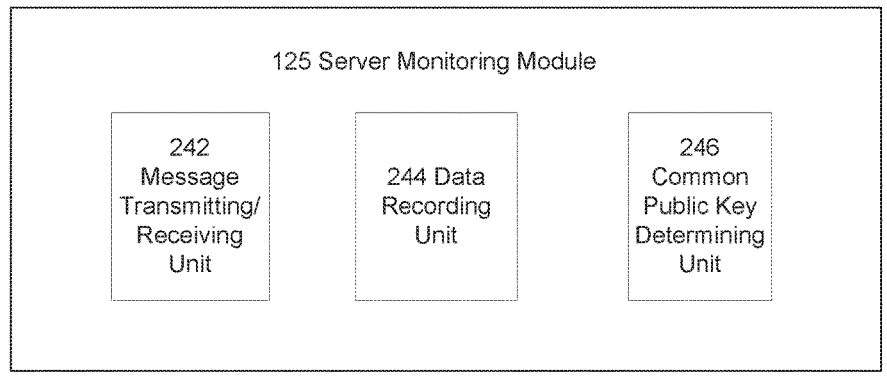
FIG. 2B illustrates a block diagram of a secure boot module signing in accordance with some implementations of the present disclosure.

FIG. 2B illustrates a block diagram of a network architecture for secure remote kernel module signing in accordance with some implementations of the present disclosure. In FIG. 2B, the server monitoring module 125, of examples of the disclosure, can include a message transmitting/receiving unit 242, a data recording unit 244, and a common public key determining unit 246.

The message transmitting/receiving unit 242 can transmit a message indicating a list that includes indicators of public keys or MOKs that reside on or are associated with the client device 110. The message transmitting/receiving unit 242 can also receive a message indicating a list of public keys and/or a list of software versions (e.g., supported kernel versions) that are supported by the respective server. After the message is received, the data recording unit 244 can record or store the information in an example data structure that can be refreshed on a periodic basis or can be updated whenever a new message is received. The data can indicate to the client device 110 the public keys and the software versions (e.g., supported kernel versions) that are supported by a respective server. The common public key determining unit 246 can refer to the data recording unit 244 to determine a server that has a public key that is in common with a public key that is associated with or present on the client device 110. The common public key determining unit 246 can also refer to the data recording unit 244 to determine a server that can support a software version (e.g., a supported kernel version) that is in common with that of the client device 110.

In an example, when a signed compiled script is needed to be installed on the client device 110, the server monitoring module 125 can direct a request to a particular server that has a public key that is in common with a public key that is associated with or present on the client device 110 and also supports the software version of the client device 110. In an example, the client device 110 can send a script to the particular server to be compiled and signed by the corresponding private key that is paired with the common public key, and then the signed compiled script can be sent from the particular server to the client device without sending or attaching a public key.

In another example, when the common public key determining unit 246 determines that there is no server that has a public key that is common to a key of the client device 110, then the client device 110 can select a server to create a public key (or a machine owner key) and transmit the public key (or public certificate) to the client device 110 for installation. After the public key is installed, which may require a reboot of the client device 110, the selected server can compile the script, sign it with the associated private key, and then transmit the signed compiled script to the client device 110.

Figure 3:
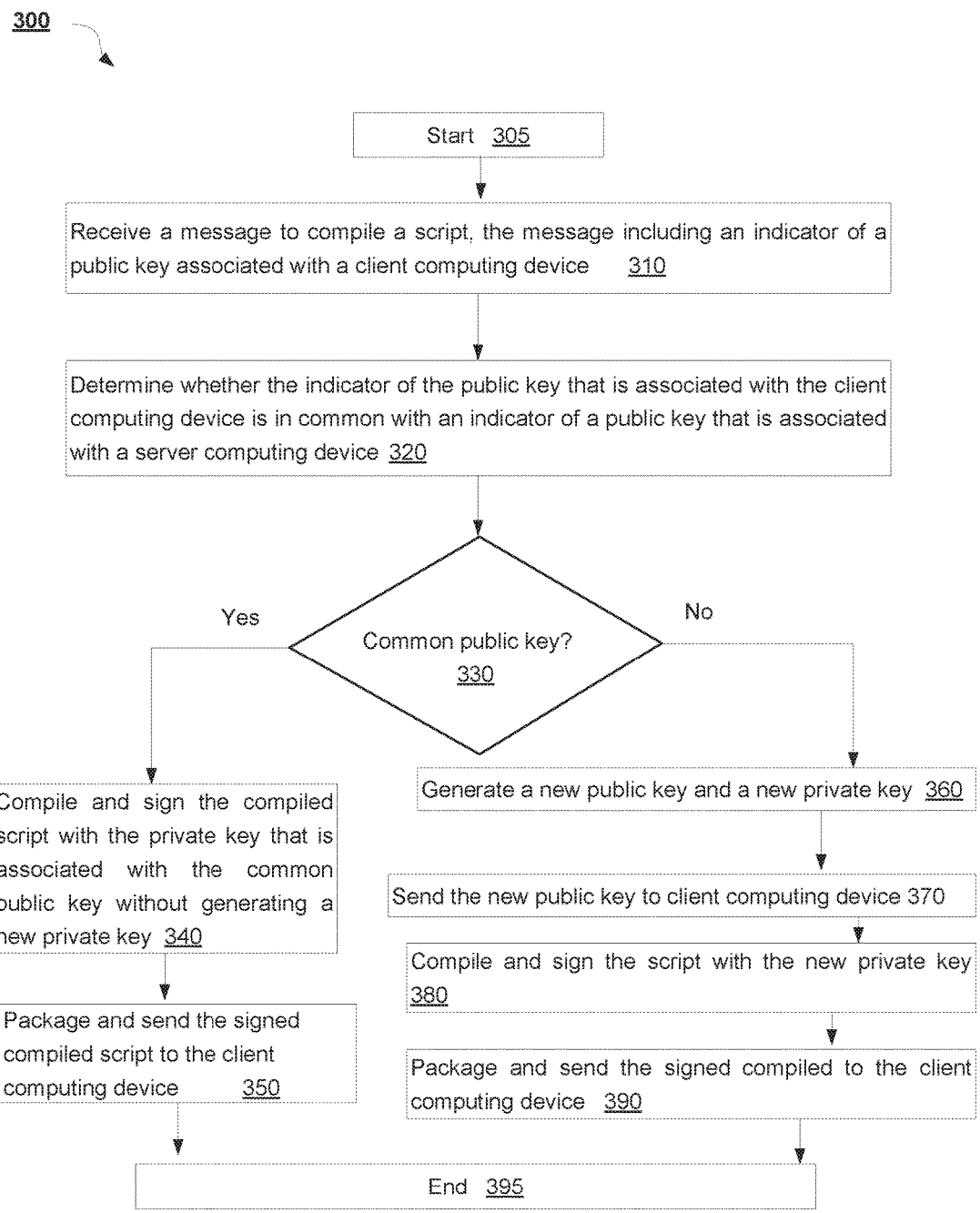
FIG. 3 shows a flow diagram illustrating an example for a secure boot module signing in accordance with some implementations of the present disclosure.

FIG. 3 shows a flow diagram illustrating a method 300 for associating interdependent subscriptions in accordance with some implementations of the present disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by the script compiling, signing, and packaging module 120 described with respect to FIG. 1.

Method 300 begins at block 305 and proceeds to block 310, where the script compiling, signing, and packaging module 120 receives a message to compile a script, the message including a list of indicators of public keys or MOKs that reside on or are associated with a client computing device 110. Subsequently, at block 320, the script compiling, signing, and packaging module 120 can use the list of indicators of public keys or MOKs to determine whether a public key or MOK that is associated with the client computing device is in common with a public key that is associated with a server computing device (e.g., server device "A" 140).

Next, at block 330, when the script compiling, signing, and packaging module 120 determines that an MOK or a public key that is associated with the client computing device is in common with a public key that is associated with a server computing device, then the method proceeds to block 340. At block 340, the script compiling, signing, and packaging module 120 can compile the kernel module or script 135 and sign the compiled script with the private key that is associated with the common public key or MOK. At block 350, the script compiling, signing, and packaging module 120 can package and send the compiled and signed script to the client device 110, and the process ends at block 395.

Reverting to block 330, when the script compiling, signing, and packaging module 120 determines that an MOK or a public key that is associated with the client computing device is not in common with a public key that is associated with a server computing device, then the method proceeds to block 360. At block 360, the script compiling, signing, and packaging module 120 can generate a new public key or MOK and a new private key. At block 370, the script compiling, signing, and packaging module 120 can send the new public key to the client device 110. At block 380, the script compiling, signing, and packaging module 120 can compile the kernel module or script 135 and sign the compiled script with the new private key. At block 380, the script compiling, signing, and packaging module 120 can compile and sign the script with the new private key. At block 390, the script compiling, signing, and packaging module 120 can package and send the signed compiled script to the client device 110, and the process ends at block 395.

Figure 4:
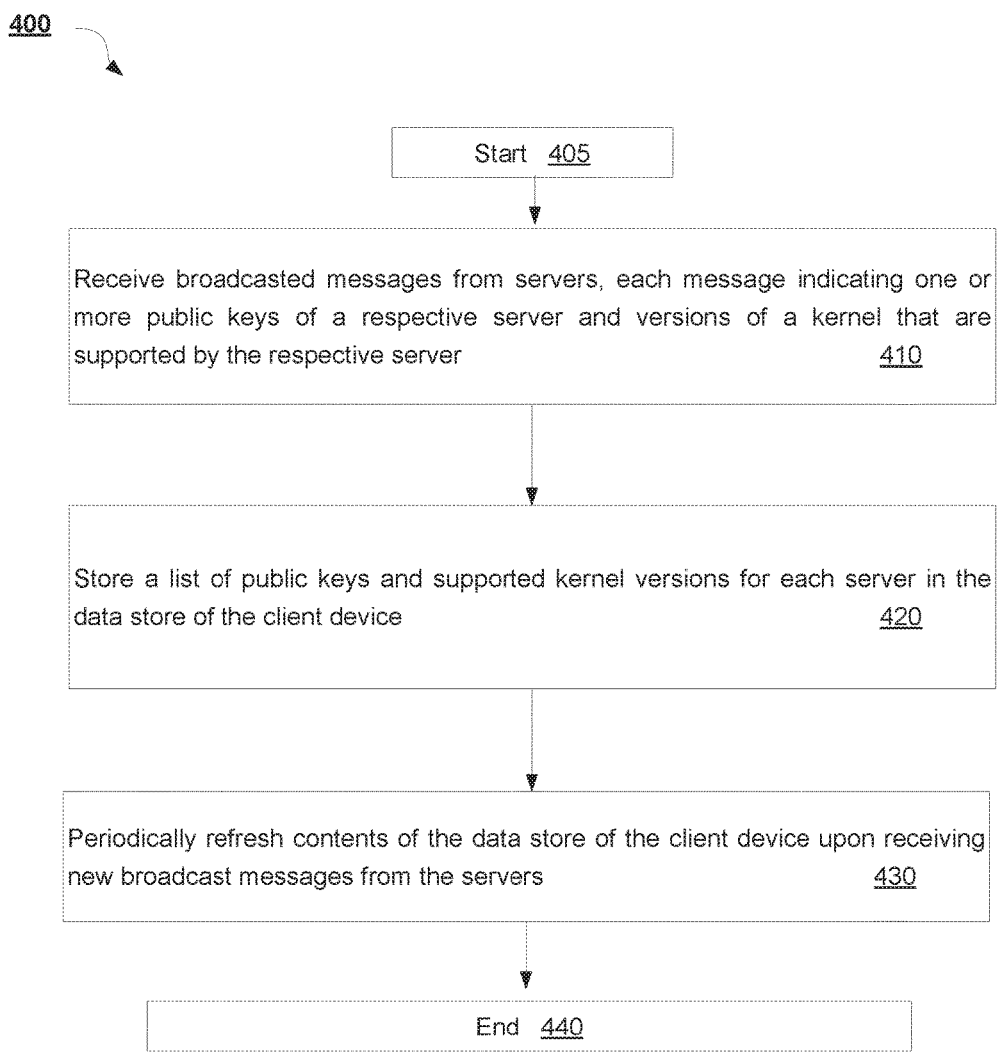
FIG. 4 shows a flow diagram illustrating an example for a secure boot module signing in accordance with some implementations of the present disclosure.

FIG. 4 shows a flow diagram illustrating an example for a secure boot module signing in accordance with some implementations of the present disclosure. Method 400 begins at block 405 and proceeds to block 410, where the client device 110 receives broadcast messages from servers (e.g., Server Device "A" 140, Server Device "B" 150), each message indicating one or more public keys of the respective server and versions of a kernel that are supported by the respective server. At block 420, the client device 110 can store a list of public keys and supported kernel versions 115 for each server. At block 430 the client device 110 can periodically refresh the contents of the data store 130 upon receiving new broadcast messages from the servers, and the method ends at block 440.

Figure 5:
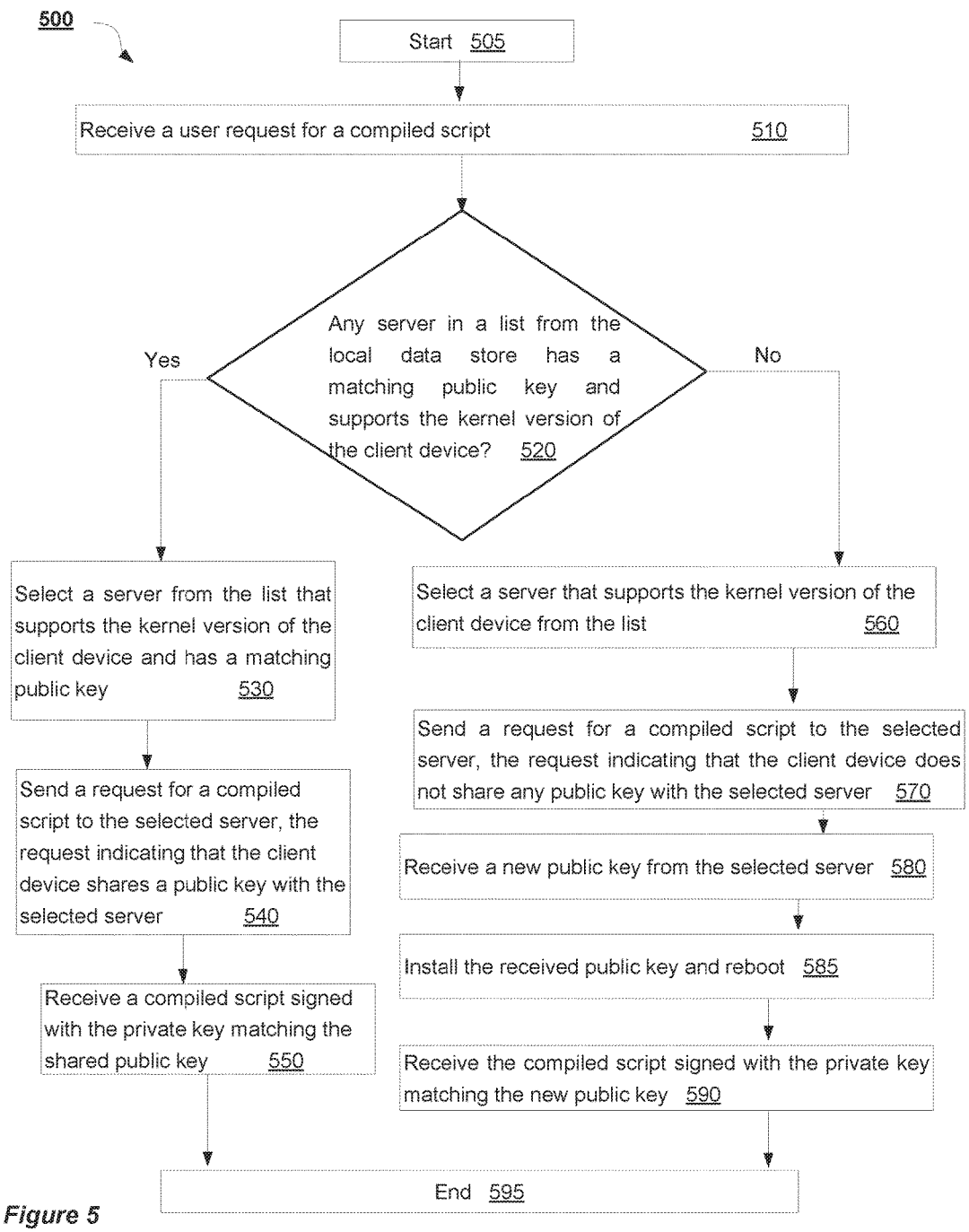
FIG. 5 shows a flow diagram illustrating an example for a secure boot module signing in accordance with some implementations of the present disclosure.

FIG. 5 shows a flow diagram illustrating an example for a secure boot module signing in accordance with some implementations of the present disclosure. Method 500 begins at block 505 and proceeds to block 510, where the client device 110 receives, via a processing device, a user request for a compiled script. Subsequently, at block 520, the client device 110 can use the list of server device public keys and supported kernel versions 115 to determine whether any server in the list from the data store 130 has a matching public key or MOK and supports the kernel version of the client device 110.

Next, at block 530, when the client device 110 determines that a server in the list of server device public keys and supported kernel versions 115 has a matching public key or MOK and supports the kernel version of the client device 110, the client device 110 can select a server from the list that supports the kernel version of the client device 110 and has a matching public key. At block 540, the client device 110 can send a request for a compiled script to the selected server (e.g., Server Device "A" 140, Server Device "B" 150). In an example, the request can indicate that the client device 110 shares a public key with the selected server. At block 550, the client device can receive a compiled script signed with the private key that matches the public key that is in common with the client device 110 and the server, and the method ends at block 595.

Reverting to block 520, when the client device 110 determines that a server in the list of client device public keys and supported kernel versions 115 does not have a matching public key or MOK, the method proceeds to block 560 where the client device 110 can select a server (e.g., Server Device "A" 140, Server Device "B" 150) that supports the kernel version of the client device 110. At block 570, the client device 110 can send a request for a compiled script to the selected server, the request indicating that the client device 110 does not share any public key with the selected server, and the method proceeds to block 580.

At block 580, the client device 110 can receive a new public key from the selected server. After the new public key is received by the client device 110, at block 585 the client device can install the received public key and can reboot. At block 590 the client device can receive the compiled script that is signed with the private key matching the new public key, and the process ends at block 595.

Figure 6:
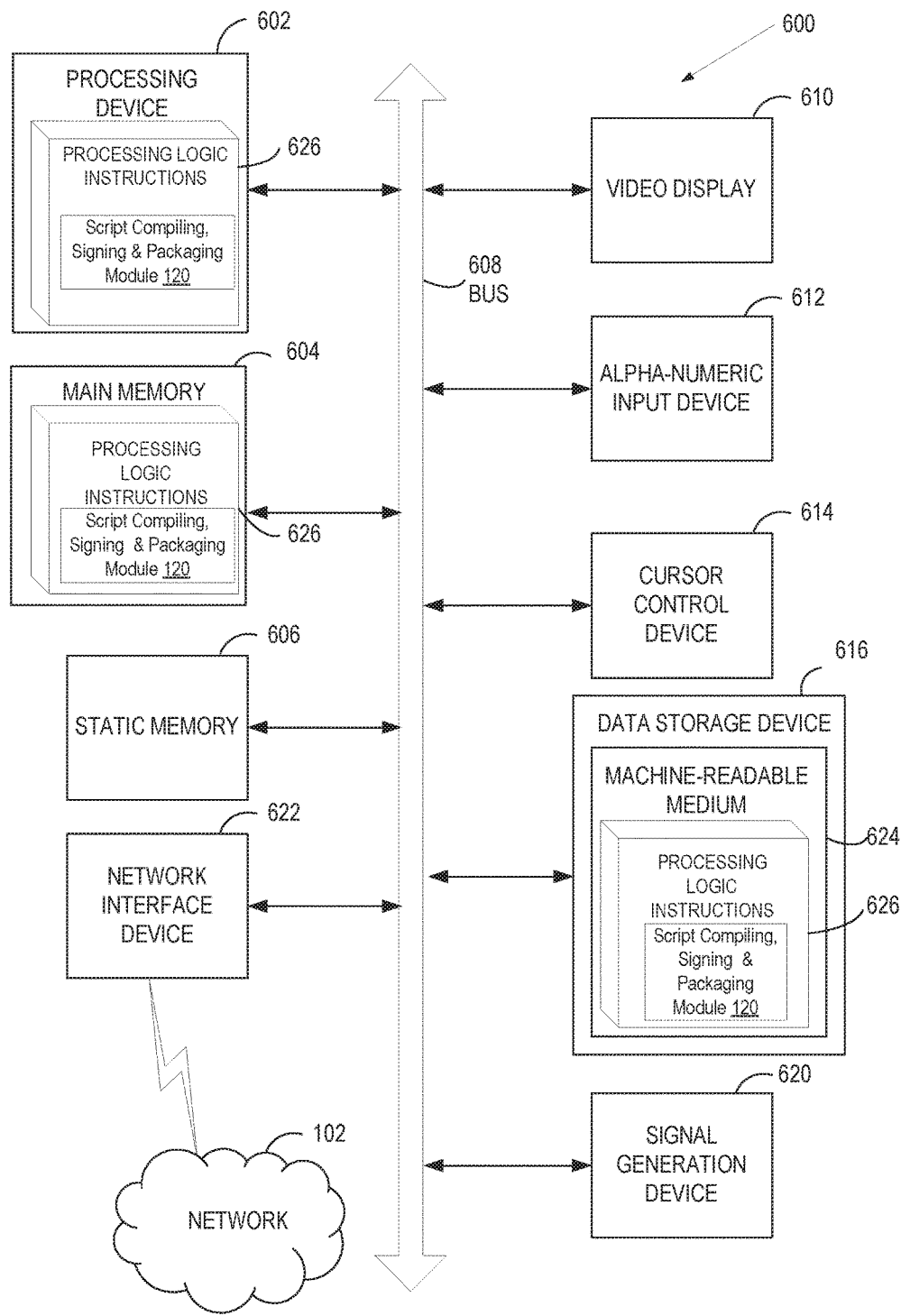
FIG. 6 shows a diagrammatic representation of a machine in the form of a computer system, in accordance with one example.

FIG. 6 depicts a diagrammatic representation of a machine in the form of a computer system 600 within which a set of memory instructions, for causing the machine to perform any one or more of the methodologies discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 600 includes a processing device 602 (e.g., a processor), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device), which communicate with each other via a bus 608.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the operations for the script compiling, signing, and packaging module 120 and/or the server monitoring module 125 for performing steps discussed herein.

The computer system 600 may further include a network interface device 622. The network interface device may be in communication with a network 102. The computer system 600 also may include a video display unit 610 (e.g., a liquid crystal display (LCD), a touch screen, or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a computer-readable storage medium (or more specifically a non-transitory computer-readable storage medium) 624 on which is stored one or more sets of instructions 626 (e.g., instructions executed by the script signing and packaging module 120 and/or the server monitoring module 125) for the computer system 600 representing any one or more of the methodologies or functions described herein. The instructions 626 for the computer system 600 may also reside, completely or at least partially, within the main memory 604 and/or within the processing device 602 during execution thereof by the computer system 600, the main memory 604 and the processing device 602 also constituting computer-readable storage media. The instructions 626 for the computer system 600 may further be transmitted or received over a network via the network interface device 622.

While the computer-readable storage medium 624 is shown in an example to be a single medium, the term "computer-readable storage medium" should be taken to include a single medium or multiple media (e.g., a centralized or distributed database, and/or associated caches and servers) that store the one or more sets of instructions 626. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media.

Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "associating," "executing," "adjusting," "sending," "receiving," "determining," "transmitting," "identifying," "specifying," "granting," "accessing," "assigning," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method, comprising:
    receiving, by a processing device, a message to compile a script, the message further comprising a public key associated with a client computing device and an indication of whether the client computing device requires a secure boot signing; and
    responsive to determining that the client computing device requires the secure boot signing:
        determining whether the public key associated with the client computing device matches a public key associated with a first server computing device; and
        in response to determining that the public key associated with the client computing device matches the public key associated with the first server computing device:
            compiling the script;
            signing the compiled script with a private key that is associated with the public key that is common to the client computing device and the first server computing device without generating a new private key; and
            sending the signed compiled script to the client computing device.

2. The method of claim 1, further comprising:
    in response to determining that the public key associated with the client computing device does not match the public key associated with the first server computing device:
        compiling the script;
        generating a new private key and a new public key;
        sending the new public key to the client computing device; and
        signing the compiled script with the new private key.

3. The method of claim 1, further comprising:
    in response to determining that the public key associated with the client computing device does not match the public key associated with the first server computing devices:
        determining whether the public key associated with the client computing matches a public key associated with a second server computing device;
        in response to determining that the public key associated with the client computing device matches the public key associated with the second server computing device:
            compiling the script;
            signing the compiled script with a private key that is associated with the public key that is common to the client computing device and the second server computing device without generating a new private key; and
            sending the signed compiled script to the client computing device.

4. The method of claim 3, further comprising:
    in response to determining that the public key associated with the client computing device does not match the public keys associated with the first server computing device or the second server computing device;
        generating a new private key and a new public key;
        sending the new public key to the client computing device;
        signing the compiled script with the new private key; and sending the signed compiled script to the client computing device.

5. The method of claim 1, wherein the public key associated with the client computing device is a machine owner key.

6. The method of claim 1, wherein the script is compiled into at least one of a kernel module or a kernel driver.

7. A system comprising:
    a memory device; and
    a processing device, communicably coupled to the memory device, to:
        receive a message to compile a script, the message further comprising a public key associated with a client computing device and an indication of whether the client computing device requires a secure boot signing; and
        responsive to determining that the client computing device requires the secure boot signing:
            determine whether the public key associated with the client computing device matches a public key associated with a first server computing device;
            in response to determining that the public key associated with the client computing device matches the public key associated with the first server computing device:
                compile the script;
                sign the compiled script with a private key that is associated with the public key that is common to the client computing device and the first server computing device without generating a new private key; and
                send the signed compiled script to the client computing device.

8. The system of claim 7, wherein the processing device is further to:
    in response to determining that the public key associated with the client computing device does not match the public key associated with the first server computing device:
        compile the script;
        generate a new private key and a new public key;
        send the new public key to the client computing device; and
        sign the compiled script with the new private key.

9. The system of claim 7, wherein the processing device is further to:
    in response to determining that the public key associated with the client computing device does not match the public key associated with the first server computing devices:

determine whether the public key associated with the client computing device matches a public key associated with a second server computing device; and in response to determining that the public key associated with the client computing device matches the public key associated with the second server computing device:

compile the script;

sign the compiled script with a private key that is associated with the public key that is common to the client computing device and the second server computing device without generating a new private key; and send the signed compiled script to the client computing device.

10. The system of claim 9, wherein the processing device is further to:

in response to determining that the public key associated with the client computing device does not match the public keys associated with the first server computing device or the second server computing device;

generate a new private key and a new public key;

send the new public key to the client computing device; and sign the compiled script with the new private key; and send the signed compiled script to the client computing device.

11. The system of claim 7, wherein the public key associated with the client computing device is a machine owner key.

12. The system of claim 7, wherein the script is compiled into at least one of a kernel module or a kernel driver.

13. A non-transitory machine-readable storage medium including instructions that, when accessed by a processing device of a client computing device, cause the processing device to:

determine whether the client computing device requires a secure boot signing; and responsive to determining that the client computing device requires the secure boot signing:

determine whether a server computing device supports a kernel version of the client computing device and has a public key that matches a public key associated with the client computing device;

in response to determining that the server computing device supports a kernel version of the client computing device but does not have a public key that matches a public key associated with the client computing device:

send a request for a compiled script to the server computing device;

receive a new public key from the server computing device;

install the new public key on the client computing device;

reboot the client computing device; and receive a compiled script signed with a private key matching the new public key.

14. The non-transitory machine-readable storage medium of claim 13, wherein the processing device is further to:

in response to determining that the server computing device supports the kernel version of the client computing device and has a public key that matches a public key associated with the client computing device:

send the request for the compiled script to the server computing device; and receive the compiled script signed with a private key matching the public key associated with the selected server computing device and the client computing device.

15. The non-transitory machine-readable storage medium of claim 13, wherein the request indicates that the client computing device does not share any public key with the server computing device.

16. The non-transitory machine-readable storage medium of claim 14, wherein the request indicates that the public key associated with the client computing device matches the public key associated with the server computing device.

17. The non-transitory machine-readable storage medium of claim 13, wherein the public key associated with the client computing device is a machine owner key.

18. The non-transitory machine-readable storage medium of claim 13, wherein the script is compiled into at least one of a kernel module or a kernel driver.

19. The method of claim 1, wherein the determining whether the public key associated with the client computing device matches a public key associated with a first server computing device further comprises determining whether the first server computing device supports a kernel version of the client computing device.

20. The system of claim 7, wherein to determine whether the public key associated with the client computing device matches a public key associated with a first server computing device, the processing device is further to determine whether the first server computing device supports a kernel version of the client computing device.

* * * * *